United States Patent [19]

Rudman

[11] Patent Number: 4,615,180
[45] Date of Patent: Oct. 7, 1986

[54] APPARATUS FOR CONTROL OF A VEHICLE AIR CONDITIONER

[76] Inventor: Louis Rudman, 4 Dogwood Ter., Newtown, Conn. 06470

[21] Appl. No.: 754,278

[22] Filed: Jul. 12, 1985

[51] Int. Cl.⁴ .................... B60H 1/32; H01H 35/02
[52] U.S. Cl. ................................. 62/133; 62/323.4; 200/61.45 R; 180/282
[58] Field of Search ............... 62/133, 323.4, 323.1; 200/52 A, 61.45 R; 180/282, 283, 284, 285; 307/10 R; 123/198 R

[56] References Cited

U.S. PATENT DOCUMENTS

| | | | |
|---|---|---|---|
| 1,391,782 | 9/1921 | McDannold | 180/283 X |
| 2,503,449 | 4/1950 | Murray | 180/283 |
| 4,155,225 | 5/1979 | Upchurch, Jr. | 180/282 X |
| 4,206,613 | 6/1980 | Shockley | 62/133 |

Primary Examiner—Harry Tanner
Attorney, Agent, or Firm—Lawrence Hager

[57] ABSTRACT

An air conditioning control device for an automotive vehicle including an inertial switch, for example, a mercury switch, which is rendered nonconductive when the forward acceleration and/or grade of the vehicle attains a predetermined value. The inertial switch generally comprises an elongate tube which is mounted in a free swinging cradle. The cradle includes a bias tube holding means to readily enable manual adjustment of the lateral position of the inertial switch and, therefore, its on/off disposition relative to the vehicle acceleration and grade.

10 Claims, 6 Drawing Figures

APPARATUS FOR CONTROL OF A VEHICLE AIR CONDITIONER

FIELD OF THE INVENTION

This invention relates to a vehicle air conditioner control means and, more particularly, to a free swinging cradle mounted mercury type switch to facilitate adjustment.

PRIOR ART STATEMENT

Various types of air conditioner control systems have hitherto been proposed.

Typically, the prior art control switches comprise a complex mounting device which maintains the switch at a preset fixed angular orientation relative to the vehicle frame or axis.

The present applicant observed that the prior art devices required laborious adjustment procedures, are complex, relatively expensive to manufacture and sumptuous in component parts.

Some prior art patents of interest include U.S. Pat. Nos. 4,206,613 issued June 10, 1980 to Norman K. Shockley; 3,121,314 issued Feb. 18, 1964 to Reinosuke Koyanagi; 4,155,255 issued May 22, 1979 to Thomas B. Upchuach, Jr.; 4,299,094 issued Nov. 10, 1981 to Chester F. Lummen; 4,305,258 issued Dec. 15, 1981 to Joseph H. Spencer, Jr.

These patents are mentioned as being representative of the prior art and other pertinent references may exist. None of the above cited patents are deemed to affect the patentability of the present claimed invention.

The present invention involves a novel and improved control device for a vehicle air conditioner which affords a substantial solution to the difficulties and problems encountered with the prior art.

For example, in contrast to the prior art, the present invention provides a control device or inertial/dispositional on/off switch means for a vehicle air conditioner having a pivotally mounted (mercury type switch) bracket to enable manual adjustment of the disposition of the mercury switch with sliding of the mercury switch between spring bias mounting arms. The relative location of the mercury switch affecting the vehicle inertia and/or grade necessary to cause the mercury switch to turn on and off the air conditioner.

SUMMARY OF THE INVENTION

An apparatus (29,30) for automatically controlling a vehicle air conditioning system in which deactivation and/or activation is signalled upon certain inertial and grade or slope orientation of an over-the-road vehicle, comprising:

housing means (10) for being affixed to a portion of a vehicle (not shown);

pivot means (11) cantilevered mounted within said housing means;

bracket means (12) having a rear pivot member (13) and a front pivot member (14) each containing a pivot mounting hole (15 and 16) for receiving said pivot means therein, and having a plurality of outwardly projecting leaf spring like bias arms (17,18,19 and 20) configured for receiving the mercury switch (21);

an elongate cylindrical mercury type switch (21) having a pair of spaced apart electrodes (22,23) each connected to a respective electrical lead (24,25), said mercury switch having a quantity of liquid mercury (26) therein; and a pair of terminal means (27,28) each being electrically connectable with a respective electrical lead (24,25) of said mercury switch, one of said terminal means (27) being electrically connectable to an inertial/slope bypass switch (29) and to an electrical terminal of an air conditioner compressor clutch (31), the other terminal means (28) being connectable to an electrical terminal of the vehicle air conditioner on/off switch (32).

Accordingly, it is an object of the present invention to provide a new and improved device for the automatic on/off control of a vehicle air conditioner.

It is a further object of the present invention to provide a novel inertial switch device for a vehicle air conditioner.

It is a further object of the present invention to provide a novel grade or slope orientation switch means for controlling on/off of a vehicle air conditioner.

It is a further object of the present invention to provide a novel mounting bracket for a mercury switch being utilized for control of a vehicle air conditioning system.

It is a further object of the present invention to provide a novel means for adjusting the on/off disposition of a mercury switch to effect selective inertial and/or grade necessary for causing a switching from an "on" to an "off" state of a vehicle air conditioner.

BRIEF DESCRIPTION OF THE DRAWINGS

Other objects and advantages of the present invention will be evident from the following detailed description when read in conjunction with the accompanying drawings which illustrate the preferred embodiment of the present invention. Similar reference numerals refer to similar parts throughout.

DESCRIPTION OF THE PREFERRED EMBODIMENT

Figure 1:
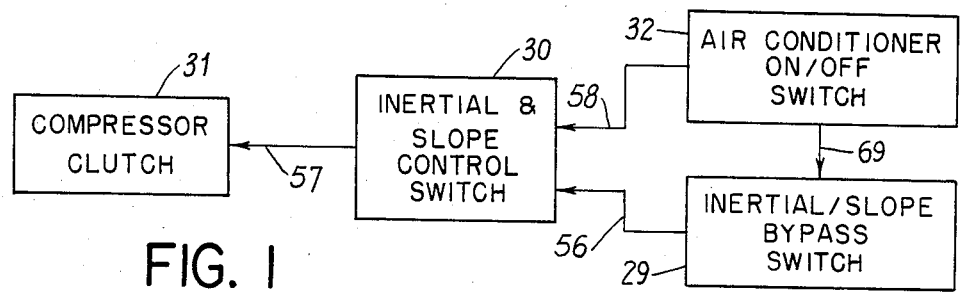
FIG. 1 is a block diagram depicting the interconnection of the inertial and slope control switch with the air conditioning system of a vehicle, in accordance with the invention.

Reference will now be made to the drawings in which there is illustrated apparatus 29 and 30 for the control of a vehicle air conditioning system in accordance with the invention. Generally speaking, the control apparatus comprises a housing 10, pivot rod 11, bracket 12, a plurality of terminals 27 and 28, a bypass switch 29 an a mercury switch 21.

The housing 10 basically comprises a square or rectangular box like structure having an internal cavity. Said cavity being accessible from without said housing 10 through a front open window or opening 33. Housing 10 includes top wall 34, bottom wall 35, side walls 36 and 37 and rear wall 38. A front cover plate (not shown) may also be provided to cover the control switch mechanism. The front cover plate may be affixed to housing 10 by conventional means such as screws 39 or a hinged door type cover plate may be utilized. The constituent parts of housing 10 and the front cover plate (not shown) may be formed of metal, plastic or from various resins.

Pivot rod or pin 11 comprises an elongate round rod shaped member which is cantilever mounted at one end 40 to rear wall 38. For example, assuming housing 11 is formed of metal, a metal pivot rod 11 may be riveted, bolted or welded to rear wall 38. On the other hand, if housing 11 is formed of a plastic like material, a plastic pivot rod 11 may be integrally formed therewith. The free end 41 of pivot rod 11 has a circumferential notch 42 for receiving retaining clamp 43.

Figure 2:
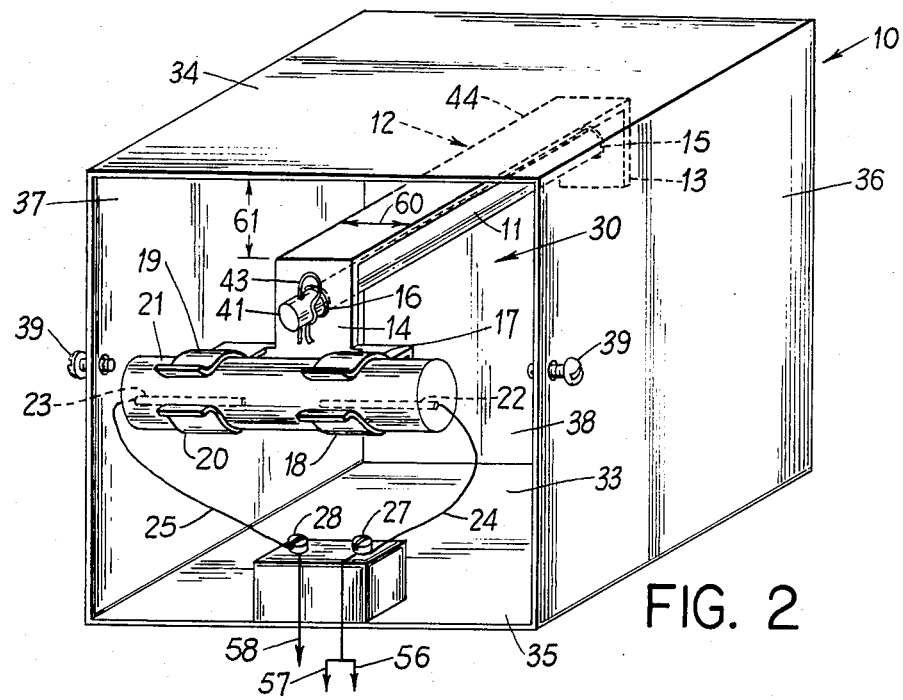
FIG. 2 is a perspective view of the inertial and slope control switch in accordance with the invention.
Figure 3:
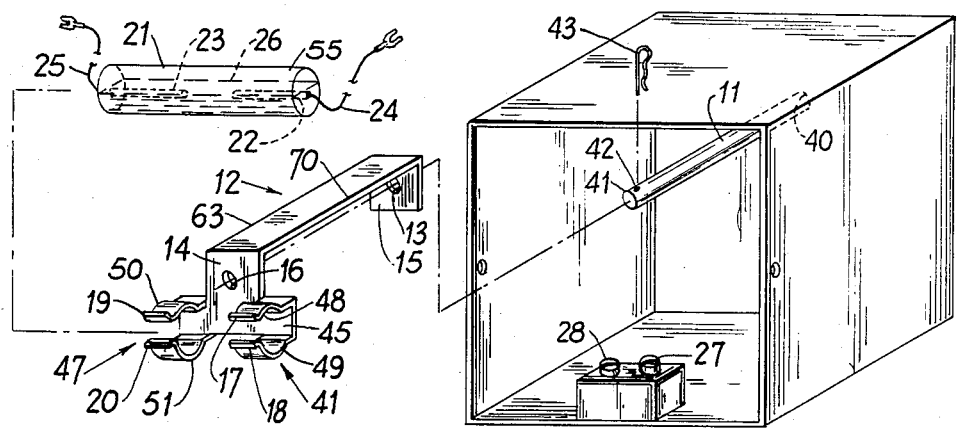
FIG. 3 is an exploded view of the inertial and slope control switch shown in FIG. 2.

Bracket 12 basically speaking comprises an inverted U-shaped member having a rear pivot pin mounting member or arm 13, a front pivot member or arm 14, an intermediate connecting beam 44, and a front switch mounting plate 45 connected to or integrally formed with arm 14. Pivot pin mounting arms 13 and 14 have a pivot pin receiving hole 15 and 16, respectively. Holes 15 and 16 are dimensioned for pivotally receiving pivot pin 11. With pivot pin mounting arms 13 and 14 pivotally mounted on pivot pin 11 as shown in FIG. 2, retaining clamp 43 is clipped or clamped about notch 42 to retain bracket 12 mounted on pivot pin 11. Switch mounting plate 45 generally comprises a rectangular flat member having two pairs of leaf spring like mercury switch mounting cradles or brackets 46 and 47. Cradle 46 comprises two spaced apart contoured arms 17 and 18. Mercury switch mounting bracket or cradle 47 comprises two spaced apart contoured arms 19 and 20. Mounting arms 17 and 18, 19 and 20 each have a convex curvature 48 and 49, 50 and 51, respectively, dimensioned to snugly receive a portion of mercury switch 21 therebetween under leaf spring like bias.

Mercury switch 21 may be of conventional design comprising electrical elements or terminal 22 and 23 spaced apart within an elongate, for example, glass, tube 55 partially filled with mercury or other suitable electrically conductive fluid or liquid. Mercury switch 21 is dimensioned for being held by mounting brackets 46 and 47 under spring like bias with tube 55 being received between arm curvatures 48 and 49, 50 and 51, respectively. The tension being applied by mounting brackets 46 and 47 on mercury switch 21 is selected, for example, empirically, to maintain mercury switch 21 in a selected predetermined manually disposed position while the vehicle is in motion, and to enable manual re-disposition or adjustment (not shown) by manually causing sliding of the mercury switch 21 from right-to-left or left-to-right. Electrical elements 22 and 23 are connected to electrical leads 24 and 25, respectively. Leads 24 and 25 are connected to terminals 27 and 28, respectively. Terminal 27 is connected, via lead 56, to the inertial/slope bypass switch 29 and to the vehicle compressor clutch 31, via lead 57. Terminal 28 is connected, via lead 58, to the vehicle air conditioner on/off switch 32.

OPERATION

The operation of switch 30 will now be discussed with particular reference to FIGS. 2, 4, 5 and 6.

With the vehicle (not shown) located on level ground, i.e., horizontal, inertial and slope control switch 30 is affixed in conventional manner to a portion of the vehicle such that the longitudinal axis of mercury switch 21 is substantially parallel therewith. The width 60 of the flat rectangular connecting beam 44 is predetermined, for example, empirically, relative to the distance 61 between connecting beam 44 and top wall 34, to define a slope or tilt angle 62, for example, between 10 and 20 degrees (see FIG. 4).

First, let us assume that mercury switch 21 is substantially centrally located in brackets 46 and 47 as shown in FIG. 2. With this disposition of mercury switch 21, as the vehicle (not shown) is driven up a slight hill or incline, for example, below 10 degrees of incline, bracket 12 pivots about pivot pin 11 generally maintaining the mercury switch 21 horizontal and, therefore, mercury 26 shorting or interconnecting terminals 22 and 23. With terminals 22 and 23 short circuited, the air conditioner compressor clutch 31 is maintained energized, assuming of course the on/off switch 32 is in the on condition. In this manner, the electrical so called "hot terminal" of the vehicle's standard air conditioner on/off switch 32 is coupled via: lead 58, terminal element 28, lead 25, element 23, mercury 26, element 22, lead 24, terminal 27 and lead 57, to the so called "hot terminal" input (not shown) of the vehicles compressor clutch 31.

Figure 4:
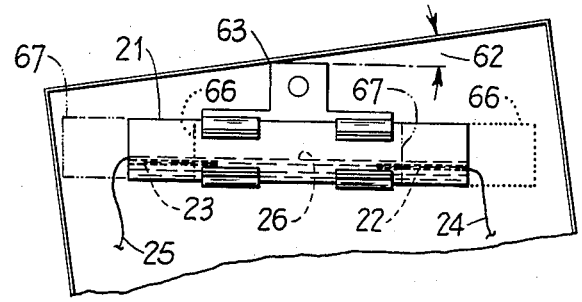
FIG. 4 is a plan view, partly cutaway, of the inertial and slope control switch while being utilized in a moving vehicle.
Figure 5:
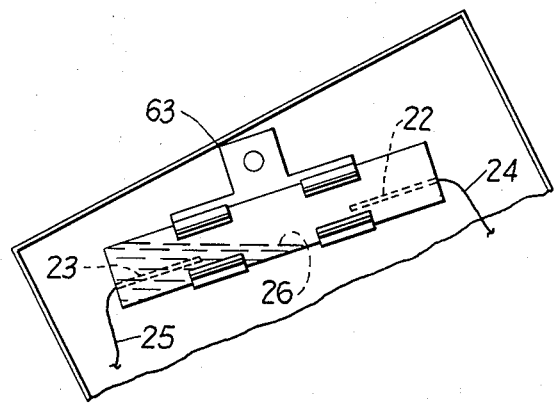
FIG. 5 is another plan view, partly cutaway, of the inertial and slope control switch while being utilized in a moving vehicle.

If we now assume that the vehicle is being driven up a hill having an incline equal to the predetermined angle 62, an edge or corner portion 63 abuts the bottom wall surface of wall 34 as shown in FIG. 4, thereby preventing any further pivoting of bracket 12. If the vehicle incline then substantially exceeds the predetermined maximum allowed, mercury switch 21 is caused to tilt as shown in FIG. 5, causing the mercury 26 to flow downward away from terminal 22. This results in an open circuit turning "off" compressor clutch 31. When the vehicle returns to an angle relative to the horizontal which is below angle 62, mercury switch 21 pivots with bracket 12 to establish a generally horizontal orientation, thereby causing the mercury 26 to electrically interconnect terminals 22 and 23. With terminals 22 and 23 short circuited together, the compressor clutch 31 is again energized.

Figure 6:
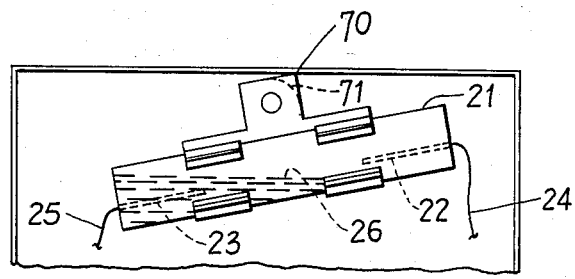
FIG. 6 is a plan view, partly cutaway, of the inertial and slope control switch operation during vehicle acceleration in accordance with the invention.

Let us now assume that the operator of the vehicle causes the acceleration thereof such that mercury switch 21 and bracket 12 are caused to rotate or pivot about pivot pin 11 due to the inertial forces on the mercury switch 21. If the inertial forces, i.e., vehicle acceleration exceeds a recommended level, for example determined empirically, mercury 26 is cause to flow backward away from terminal 22 due to the inertial forces thereon causing deenergization of compressor clutch 31. With the mercury 26 being forced rearwardly, mercury switch 21 pivots as shown in FIG. 6. As the rate of acceleration falls below the critical level, the mercury 26 re-establishes the electrical connection between terminals 22 and 23 to re-energize the compressor clutch 31. Bracket edge 70 may be contoured or rounded (shown in phantom outline 71) if desired to enable increased pivoting of bracket 12 during vehicle acceleration periods.

The above illustrated vehicle incline and/or acceleration rate to effect turn-on and turn-off of the compressor clutch 31, may be manually adjusted or changed with a disposition of mercury switch 21 within brackets 46 and 47. For example, mercury switch 21 may be manually slid or disposed forwardly relative to brackets 46 and 47 as shown by phantom dash lines 66 or rearwardly as shown by phantom dash-dot lines 67 shown in FIG. 4.

The exact position of the mercury switch 21, i.e., central or rearward or forward, relative to bracket 12 may be manually adjusted to obtain operator desired mercury switch 21 turn-on and/or turn-off effect at different vehicle acceleration rates and/or inclinations relative to horizontal. The vehicle operator (not shown) may determine the desired mercury switch 21 disposition empirically to obtain best results suitable to the driving habit and environment of each operator/owner of the vehicle installed control switch 30.

An inertial/slope bypass switch 29 is provided to effect manual bypass or disconnection of control switch 30. Basically speaking, lead 69 is connected to switch 32 such that with switches 29 and 32 being in the "on" condition, the "hot" terminal of switch 32 is connected, via lead 69, switch 29, lead 56 and lead 57 to maintain compressor clutch 31 energized regardless of the "on" and "off" condition of mercury switch 21.

It should now be recognized, that use of the inertial and slope control switch 30 as noted above, may effect substantial gas savings, reduces the drain or strain on the engine during critical periods such as going up hills and accelerating, and enables improved acceleration for safely entering parkways and the like.

A more detailed description of the vehicle electrical circuitry and interconnection of switches 29 and 30 therewith have been omitted to avoid needless prolixity.

It should be understood that the above described embodiment is illustrative of the application of the principles of the present invention. Other arrangements may be devised by those skilled in the art without departing from the spirit and scope of the claimed invention.

I claim:

1. Apparatus having particular utility for automatically controlling a vehicle air conditioning system in which deactivation and activation is signalled upon certain inertial and slope orientation conditions of an over the road vehicle, comprising:
   housing means for being affixed to a portion of the vehicle, and having an interior cavity;
   pivot means mounted to said housing means, and having a pivot rod member projecting within said cavity;
   an elongate mercury type switch means having a pair of spaced apart terminal elements and a quantity of mercury for electrically connecting said terminal elements at a first orientation of said mercury switch means and for electrically disconnecting said terminal elements at a second orientation of said mercury switch means;
   bracket means pivotally mounted to said pivot rod member for receiving said mercury switch means and to enable said bracket means and said mercury switch means to be rotated about a portion of said pivot member, said bracket means comprises a rear pivot mounting arm, a front pivot mounting arm, an intermediate connecting beam, a front switch mounting plate and a mercury switch cradle bracket means for manually slidably receiving said mercury switch under spring bias in a substantially horizontal orientation relative to said front pivot mounting arm, said front and rear pivot mounting arms each having a pivot hole for receiving said pivot member, said intermediate connecting beam being dimensioned and configured to abut a portion of said housing means with rotation of said bracket means about said pivot rod member to define a stop rotation position of said bracket means relative to said housing means; and
   a pair of electrical terminal means each being electrically connected to a respective one of said terminal elements, and each being electrically connectable to the vehicle air conditioning system; whereby with said mercury switch means being positioned at said first orientation said vehicle air conditioning system being energized, and with said mercury switch means being positioned at said second orientation said vehicle air conditioning system being deenergized.

2. Apparatus as in claim 1, wherein:
   the housing means comprises a box shaped structure.

3. Apparatus as in claim 1, wherein:
   the pivot means comprises and elongate round rod shaped member cantilever mounted at one end to said housing.

4. Apparatus as in claim 1, including:
   clamp means for retaining said bracket means on said pivot means.

5. Apparatus as in claim 1, wherein:
   the mercury switch comprises an elongate tube shaped glass cylinder with sealed ends, and having each of said terminal elements cantilever mounted from a respective cylinder end and projecting into an interior cavity of said cylinder, and having a pair of electrical leads each connected between a respective one of said terminal elements and a respective one of said pair of electrical terminal means.

6. Apparatus as in claim 1, wherein:
   one of said electrical terminal means is electrically connected with an on/off switch of the vehicle air conditioning system; and
   the other one of said electrical terminal means is electrically connectable with a terminal of the compressor clutch of the vehicle air conditioning system;
   whereby said mercury switch means being connected in electrical series circuit between the on/off switch and the compressor clutch of the vehicle air conditioning system.

7. Apparatus as in claim 6, including:
   a bypass switch means being manually actuatable for electrically interconnecting the on/off switch and the compressor clutch of the vehicle air conditioning system to bypass said mercury switch means.

8. An air conditioning on and off control device for a vehicle air conditioning system energized by an electrical power source in an over the road vehicle, said air conditioning system having an on/off switch and a compressor clutch, comprising:
   housing means (10) having a box like configuration with an internal cavity, said cavity being accessible from without said housing, said housing having a top wall (34), a bottom wall (35), a pair of side walls (36,37) and a rear wall (38);
   pivot rod means (11) cantilever affixed at one end (40) to said rear wall, said pivot rod means having a free end (41) and a circumferential notch (42);
   bracket means (12) having a rear pivot mounting member (13), a front pivot mounting member (14), and intermediate beam (44) dimensioned relative to the spacing between said pivot rod means and said top wall (35) to define a bracket means tilt angle (62), a front switch mounting plate (45) and a pair of spaced outwardly projecting cradles (46, 47), said front pivot mounting member and said rear pivot mounting member each having an aligned pivot receiving hole (15,16) dimensioned for receiving a portion of said pivot rod means to enable said bracket means to be pivoted on said pivot rod means said switch mounting plate having a rectangular shape with said pair of cradles cantilever affixed thereto, each of said cradles having a pair of arms (17,18 and 19,20) with each arm of a respective cradle having an oppositely outwardly convex curvature (48,49 and 50,51);

clamp means (43) dimensioned for being affixed about a portion of said notch (42);

mercury switch means (21) having an elongate tube shape (55) partially filled with a mercury (26), and having a pair of spaced apart terminals (22,23) each being electrically contactable with said mercury, and having a pair of electrical leads (24,25) each connected to a respective one of said terminals and having a portion extending outwardly from said mercury switch means, said mercury switch means being dimensioned for being snugly and manually slidably received between said convex curvatures of said cradles;

a first connection terminal (27) being connected to one of said electrical leads (24); and a second connection terminal (28) being connected to the other one of said electrical leads (25);

whereby with said control device being connected in series circuit with the electrical power source to the vehicle air conditioning system and mountable to the vehicle with said mercury switch means having an elongate axis horizontal with the elongate axis of the vehicle being horizontal and being freely swingable with said bracket means on said pivot rod means so as to effect a predetermined and manually adjustable inertial and slope condition of the vehicle signalling activation and deactivation of the compressor clutch of the vehicle air conditioning system.

9. A control device as in claim 8, including:

a bypass switch means (29) for disconnecting said on and off control device from the vehicle air conditioning system.

10. A control device as in claim 8, wherein:

the intermediate beam (44) has a rounded edge portion (71) to define a second bracket means tilt angle;

and said mercury switch means being selectively disposable to a first adjustment position (66) and to a second adjustment position (67) to effect an adjustment to the inertial and slope condition of the vehicle for causing an activation and deactivation of the compressor clutch.

* * * * *